US010117068B2

(12) United States Patent
Logvinov et al.

(10) Patent No.: US 10,117,068 B2
(45) Date of Patent: Oct. 30, 2018

(54) MULTI-ACKED MULTICAST PROTOCOL (71) Applicant: STMicroelectronics, Inc., Coppell, TX (US)

(72) Inventors: Oleg Logvinov, East Brunswick, NJ (US); Aidan Cully, St. Augustine, FL (US); David Lawrence, Whitehouse Station, NJ (US); Michael Macaluso, Jackson, NJ (US)

(73) Assignee: STMICROELECTRONICS, INC., Coppell, TX (US)

( * ) Notice: Subject to any disclaimer, the term of this patent is extended or adjusted under 35 U.S.C. 154(b) by 355 days.

(21) Appl. No.: 14/849,823

(22) Filed: Sep. 10, 2015

(65) Prior Publication Data
US 2016/0183062 A1 Jun. 23, 2016

Related U.S. Application Data (60) Provisional application No. 62/094,332, filed on Dec. 19, 2014.

(51) Int. Cl.
H04W 4/06 (2009.01)
H04W 74/08 (2009.01)
(Continued)

(52) U.S. Cl.
CPC ............ H04W 4/06 (2013.01); H04L 1/1854 (2013.01); H04L 12/18 (2013.01); H04L 12/413 (2013.01);
(Continued)

(58) Field of Classification Search
CPC ... H04L 1/1854; H04L 12/413; H04L 12/417; H04L 12/1868; H04L 65/4076;
(Continued)

(56) References Cited

U.S. PATENT DOCUMENTS 8,493,995 B2 * 7/2013 Krishnam ............. H04L 47/826
370/461
9,681,418 B2 * 6/2017 Ramamurthy ...... H04W 72/005
(Continued)

FOREIGN PATENT DOCUMENTS

WO WO-02103943 A1 12/2002

OTHER PUBLICATIONS

Sun, Min-Te et al: "Reliable MAC Layer Multicast in IEEE 802.11 Wireless Networks," Parallel Processing, 2002, Proceedings, International Conference on Aug. 18-21, 2002, Piscataway, NJ, IEEE, pp. 527-536, XP010609122.
(Continued)

Primary Examiner — Harun Chowdhury
(74) Attorney, Agent, or Firm — Crowe & Dunlevy (57) ABSTRACT Multicast transmissions do not allow for individual receivers to acknowledge that data was received by each receiver in the network. This is not acceptable for isochronous systems that require specific levels of QoS for each device. A multimedia communications protocol supports using multicast transmissions (one-to-many) in multimedia isochronous systems. A transmitter establishes a Multi-ACKed Multicast protocol within which a group of receiving devices can acknowledge the multicast transmission during a multi-acknowledgment period.

11 Claims, 6 Drawing Sheets (51) Int. Cl.
| | |
|---|---|
| *H04L 29/06* | (2006.01) |
| *H04L 12/413* | (2006.01) |
| *H04L 1/18* | (2006.01) |
| *H04L 12/18* | (2006.01) |
| *H04B 3/54* | (2006.01) |
| *H04L 12/761* | (2013.01) |
| *H04L 1/00* | (2006.01) |

(52) U.S. Cl.
CPC ..... *H04L 65/4076* (2013.01); *H04W 74/0808* (2013.01); *H04B 3/542* (2013.01); *H04B 2203/5408* (2013.01); *H04L 12/189* (2013.01); *H04L 45/16* (2013.01); *H04L 2001/0093* (2013.01)

(58) Field of Classification Search
CPC . H04W 4/06; H04W 72/005; H04W 74/0808; H04W 74/0816
USPC .......... 370/237, 312, 338, 345, 400
See application file for complete search history.

(56) References Cited

U.S. PATENT DOCUMENTS

| | | | |
|---|---|---|---|
| 2005/0018624 A1 | 1/2005 | Meier et al. | |
| 2005/0169296 A1 | 8/2005 | Katar et al. | |
| 2010/0254392 A1* | 10/2010 | Katar | H04L 12/417 370/400 |
| 2012/0207074 A1* | 8/2012 | Kneckt | H04W 74/0816 370/312 |

OTHER PUBLICATIONS

Daldoul, Yousri: Reliable Multicast Transport of the Video Over the WiFi Network, Dec. 16, 2013, pp. 1-127, XP055264554, Universite Sciences et Technologies Bordeaux I, retrieved from internet: URL:https://tel.archives-ouvertes.ft/tel-00919403/.
"G.hn HomePlug AV Specification : BF-055," ITU-T Draft: Study period 2005-2008, International Telecommunications Union, Geneve, CH, vol. 4/15, Dec. 3, 2007, XP017532081 (216 pages).
HomePlug® Powerline Alliance, Inc.: "HomePlug AV White Paper," document version No. HPAVWP-050818, copyright © 2005 (pp. 1-11).
EP Search Report and Written Opinion for EP15187676 dated Apr. 12, 2016 (23 pages).
Campolo Claudia et al: "A Multirate MAC Protocol for Reliable Multicast in Multihop Wireless Networks," Computer Networks, Elsevier Science Publishers B.V., Amsterdam, NL, vol. 56, No. 5, Jan. 17, 2012, pp. 1554-1567, XP028467274.
O'Mahoney, Barry et al: "G.hn: HomePlug AV Specification; BF-055," ITU-T Draft; Study Period 2005-2008, International Telecommunication Union, Geneva, CH; vol. 4/15, Dec. 3, 2007, pp. 1-602, XP017532081 (only first 208 pages applicable and attached).
Les Brown Infineon Technologies USA: "G.hn: 09CC-R12 HomePlus AV Interoperability Updates; TD09CC-062R2," ITU-T Draft; Study Period 2009-2012, International Telecommunication Union, Geneva, CH; vol. 4/15, Aug. 25, 2009, pp. 1-153, XP044104195.
Schrum, Sid et al: "G.hn: 09CC-R12a HomePlug AV Interoperability Updates; TD09CC-061R2," ITU-T Draft; Study Period 2009-2012, International Telecommunication Union,Geneva, CH; vol. 4/15, Aug. 25, 2009, pp. 1-76, XP044104194.
Pinero-Escuer P J et al: "Evaluation of a New Proposal for Efficient Multicast Transmission in HomePlug AV Based In-Home Networks," IT Revolutions (3rd International ICST Conference on IT Revolutions, 20110323 to 20110325 Cordoba); Lecture Notes of the Institute for Computer Sciences, Social-Informatics and Telecommunications Engineering ISSN 1867-8211; Springer Verlag Deu, DE, vol. 82, No. LNICST, Mar-. 23, 2011, pp. 58-70, XP008179665.
Pinero P J et al: "Analysis and Improvement of Multicast Communications in HomePlug AV-Based In-Home Networks," Computer Networks, vol. 62, Apr. 2014, pp. 89-100, XP028633295.

\* cited by examiner

MULTI-ACKED MULTICAST PROTOCOL

PRIORITY CLAIM

This application claims priority to U.S. Provisional Application for Patent No. 62/094,332 filed Dec. 19, 2014, the disclosure of which is incorporated by reference.

TECHNICAL FIELD

The present invention relates generally to a method and apparatus for a packet-based multicast communication protocol which reduces packet latency and jitter in multimedia applications.

BACKGROUND

Communication of multimedia data requires optimum performance in several parameters in order to provide the data fast enough to preserve the quality of the multimedia services (quality of service—QoS) being offered, such as VoIP, audio distribution or video distribution. The data rate, i.e., the rate of signaling each data bit or symbol, has to be fast enough to provide data at the rate or faster than the rate of consumption by the receiving device's application. In packet data communications protocols, the data rate is further complicated by the delay between sending the packets of data. The delay in delivering an individual packet of data is the packet latency. The variation of that delay across multiple receive packets is called jitter. In highly congested shared networks, devices use various methods to contend for access to the network so their packets can be sent with low enough latency and jitter in order to ensure the necessary QoS requirements of the data-consuming application.

Figure 1:
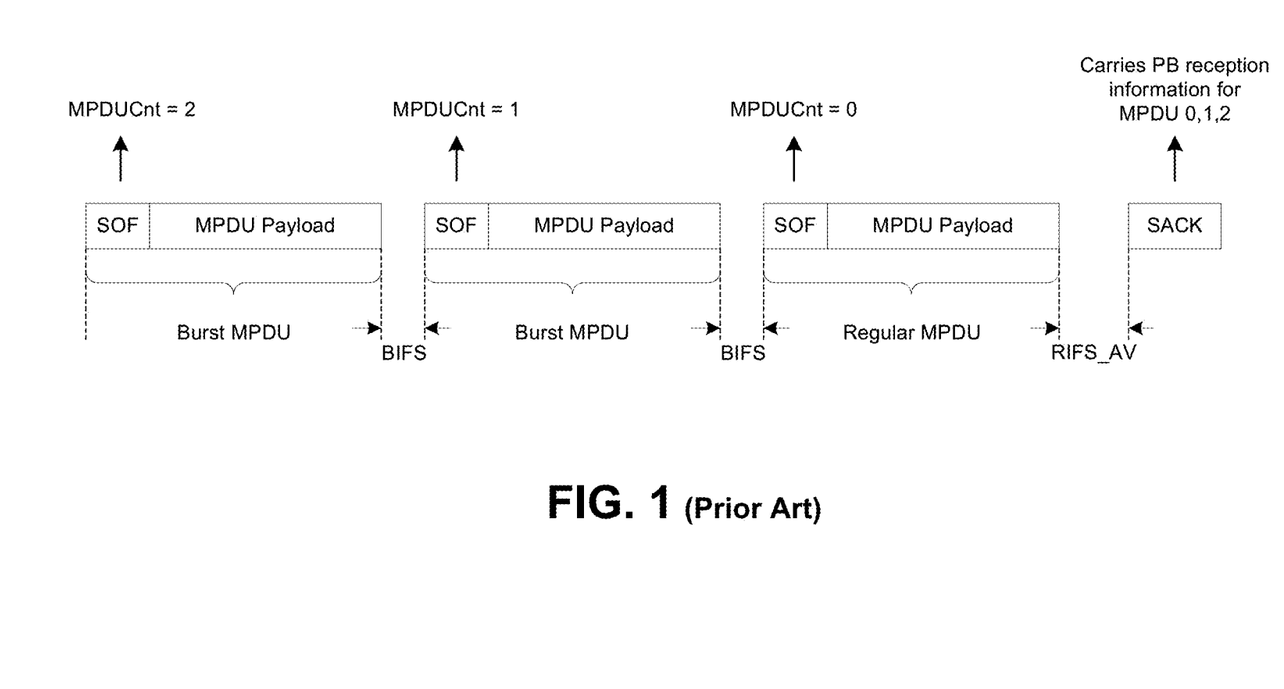
FIG. 1 illustrates an example of a MPDU bursting sequence.

In some communications protocols, for example HomePlug® AV and AV2, which are hereby incorporated by reference, a "regular" MAC protocol data unit (MPDU) can be transmitted to a receiving node's physical layer (PHY) of the OSI model and receive an acknowledgement (ACK) back for each successfully transmitted MPDU. These protocols also support a burst mode which allows the transmitter to transmit multiple long MPDUs without relinquishing the medium, and before soliciting a response. The response, a selective acknowledgement (SACK) from the receiver back to the transmitter, provides the reception status for all of the MPDU's sent by the transmitting PHY to the receiver's PHY. Long MPDUs in burst mode are separated by burst interfame spacing (BIFS). Because MPDU bursts only require a single SACK response, the time to send packets and get ACK responses is reduced and the protocol efficiency increases for that communications exchange. In the burst mode, the start of frame (SOF) delimiter contains a counter field (MPDUCnt) that indicates how many MPDUs follow the current MPDU (with the value "0" indicating the last MPDU in the sequence. FIG. 1 shows an example of MPDU bursting as known to those skilled in the art.

Figure 2:
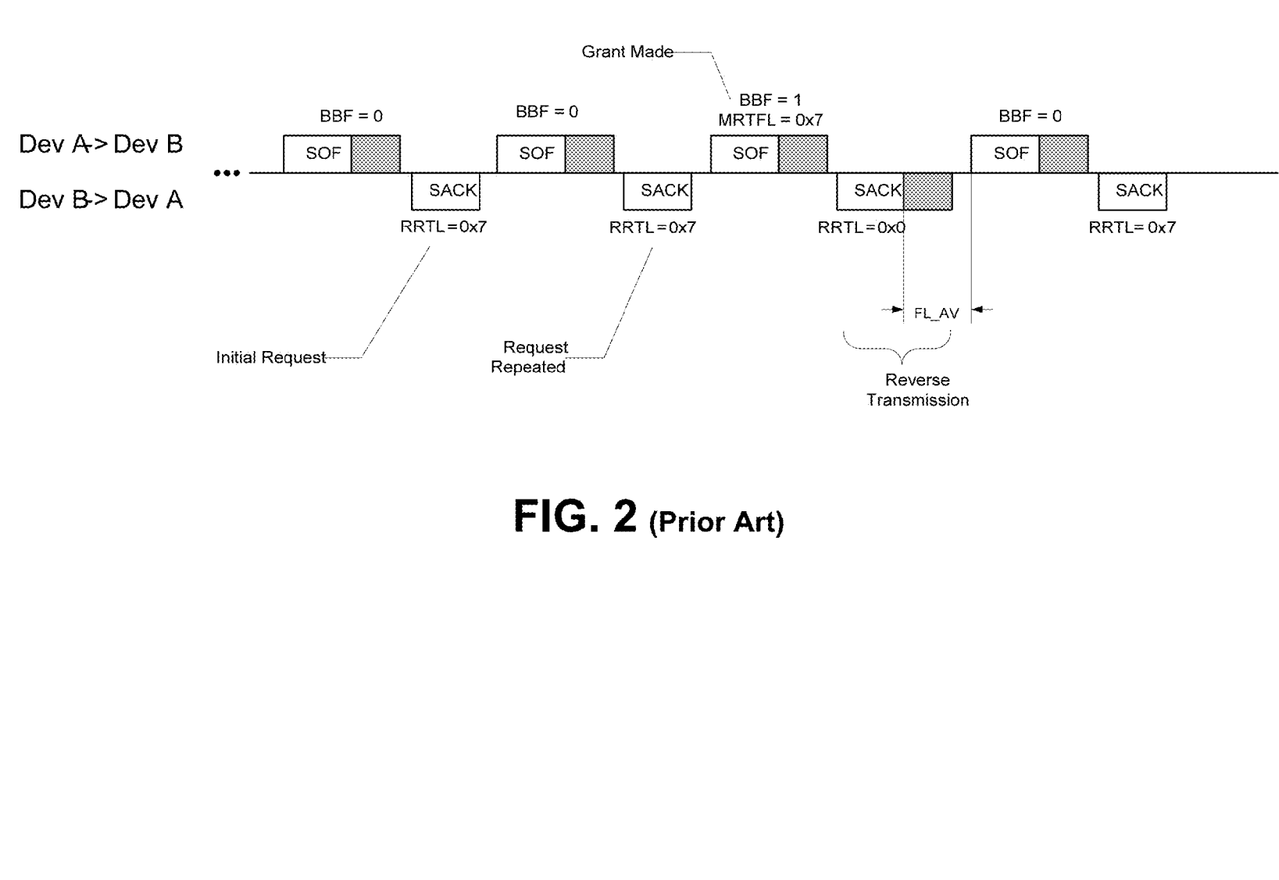
FIG. 2 illustrates an example of the bidirectional burst sequence.
Figure 3:
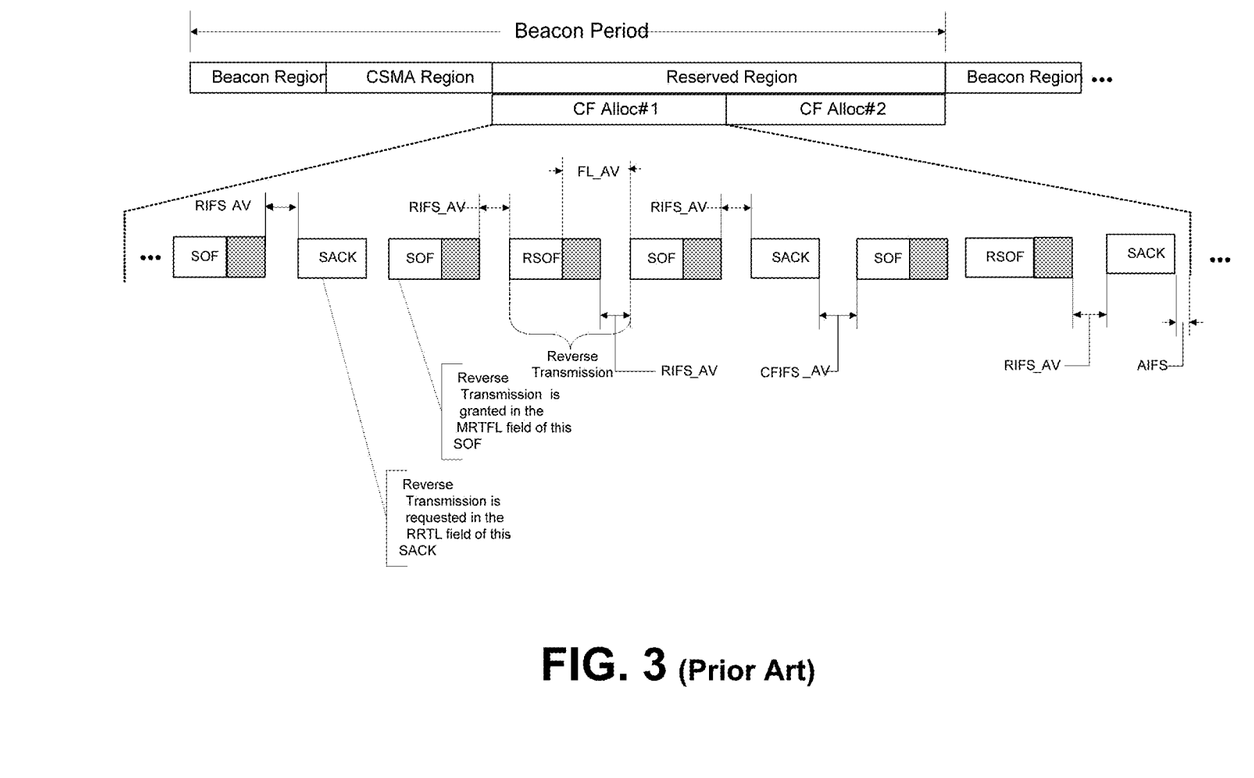
FIG. 3 illustrates interframe spacing used in bidirectional bursting.

The protocols cited above also allow for bidirectional bursting. In this mode, the transmitter allows part of the time it reserved to burst data to the receiver for the receiver to send data back to the original transmitter. It serves as an effective back channel that does not need to be negotiated with the network. The receiving station initiates bi-directional bursting by sending a "request reverse transmission flag" (RRTF) and "request reverse transmission length" (RRTL) fields in the frame control section of the SACK. The RRTL field specifies the minimum required frame length for the Reverse SOF (RSOF) MPDU. Upon receiving the request, the original transmitter decides whether to honor the request and the duration. Obviously, if the request of for more time than the original transmitter has reserved, it will be denied. FIG. 2 illustrates an example of the bidirectional burst mechanism as known to those skilled in the art. When the receiver (Dev B) determines that it wants to transmit in the reverse direction, it sets the RRTF and RRTL fields in the SACK or RSOF. This is set until the original transmitter (Dev A) responds, granting the request for the maximum duration, or until there is no longer a need to request a transmission in the reverse direction. FIG. 3 shows the various interframe spaces during a bidirectional burst. These spaces result in increased latency (reduced efficiency).

Multicast transmissions do not allow individual receivers to acknowledge that data was received by each receiver. This is not acceptable for isochronous systems that require specific levels of QoS for each device. Some protocols try to get around this limitation by allowing one station in the group to act as the proxy for the others but it does not provide information about all of the devices in the multicast. In a busy network there may not be enough time or bandwidth to accommodate the QoS requirements for isochronous traffic. A better method is needed to improve packet latency and hence communications efficiency in congested multimedia networks.

SUMMARY

In an embodiment, a multimedia communications protocol is presented that solves the problem of using multicast transmissions (one-to-many) in multimedia isochronous systems in order to reduce packet latency and jitter. The transmitter uses the SOF delimiter to initiate a novel Multi-ACKed Multicast protocol wherein a group of receiving devices all receive the same data from a Multi-ACKed Multicast transmission and return individual acknowledgments (ACK) at predetermined windows assigned to them. A Multi-ACKed Multicast transmission comprises a SOF and payload transmission. It is followed by a multi-acknowledgment period in which each receiving device is assigned a specific window for transmitting that device's reception status back to the transmitter. The transmitter may send a subsequent SOF delimiter and to continue to transmit and receive acknowledgements without re-contending for medium access, or to relinquish medium ownership with other devices outside of the multicast group. The disclosed protocol and method has the ability to be used within existing CSMA-based protocols while maintaining compatibility.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE DRAWINGS

The making and using of embodiments are discussed in detail below. It should be appreciated, however, that the present disclosure provides many applicable inventive concepts that may be embodied in a wide variety of specific contexts. The specific embodiments discussed are merely illustrative of specific ways to make and use the invention, and do not limit the scope of the invention.

Embodiments are described, without limitation, in a specific context of a protocol method and apparatus used to minimize communications packet latency and jitter for data used by multimedia devices such as an audio system wherein all of the individual network devices act as a group that has isochronous QoS requirements in order to deliver one combined experience. This disclosure also uses the HomePlug AV specification as contextual framework (including terms) for presenting the invention, although the disclosed invention is not limited to that protocol. In this disclosure, "receiver" is a topology term to help distinguish between a multicast transmitter and the receiving multicast destinations, but all transmitters and receivers described here are functionally transceivers.

In accordance with the present disclosure, network initialization data is programmed, by one or more methods such as a user interface, at the time of manufacture or a discovery protocol, with the digital information about devices on the network that are part of a group of multimedia devices that function together, such as an audio system that is rendering one music file. The digital information includes identifiers (such as device ID, MAC ID, Link ID), topology digital information (such as a sequence number for all of the devices in the network that define the device order within the group), a sequence back-off value, as well as delimiter frame lengths and other information as embodied below. The initialization data can be field programmable in order to allow equipment to be replaced or repurposed after the sale or installation.

Figure 4:
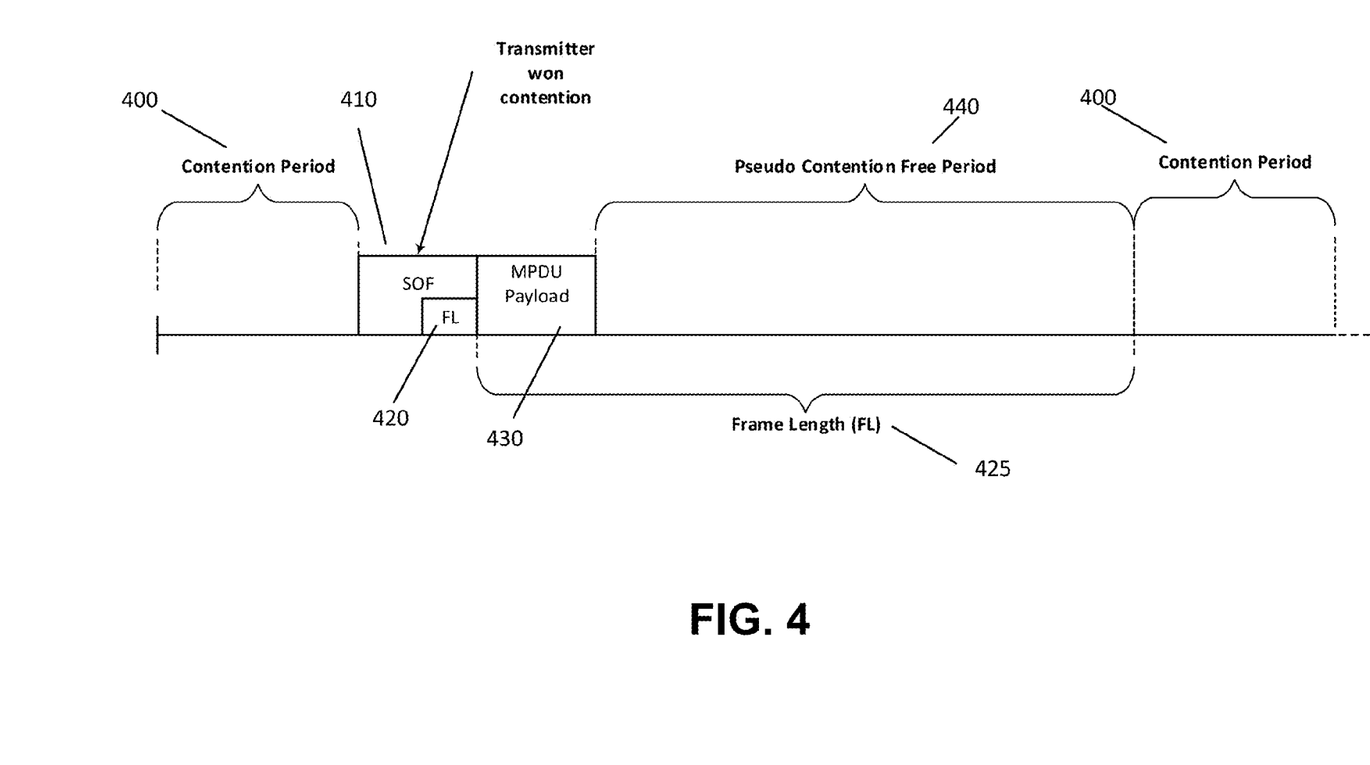
FIG. 4 illustrates the multi-acknowledgement period according to an embodiment.

In accordance to an embodiment, FIG. 4 illustrates a method of using the multi-acknowledgment period for the Multi-ACKed Multicast protocol. When the transmitter has won a CSMA contention process 400 of a carrier sense multiple access (CSMA) protocol, the transmitter transmits a start of frame (SOF) delimiter 410 which contains data including the frame length (FL) field 420 (a digital value representing duration in time) and assignment of Multi-ACK time windows. It also transmits the MAC protocol data unit (MPDU) payload 430.

Figure 5:
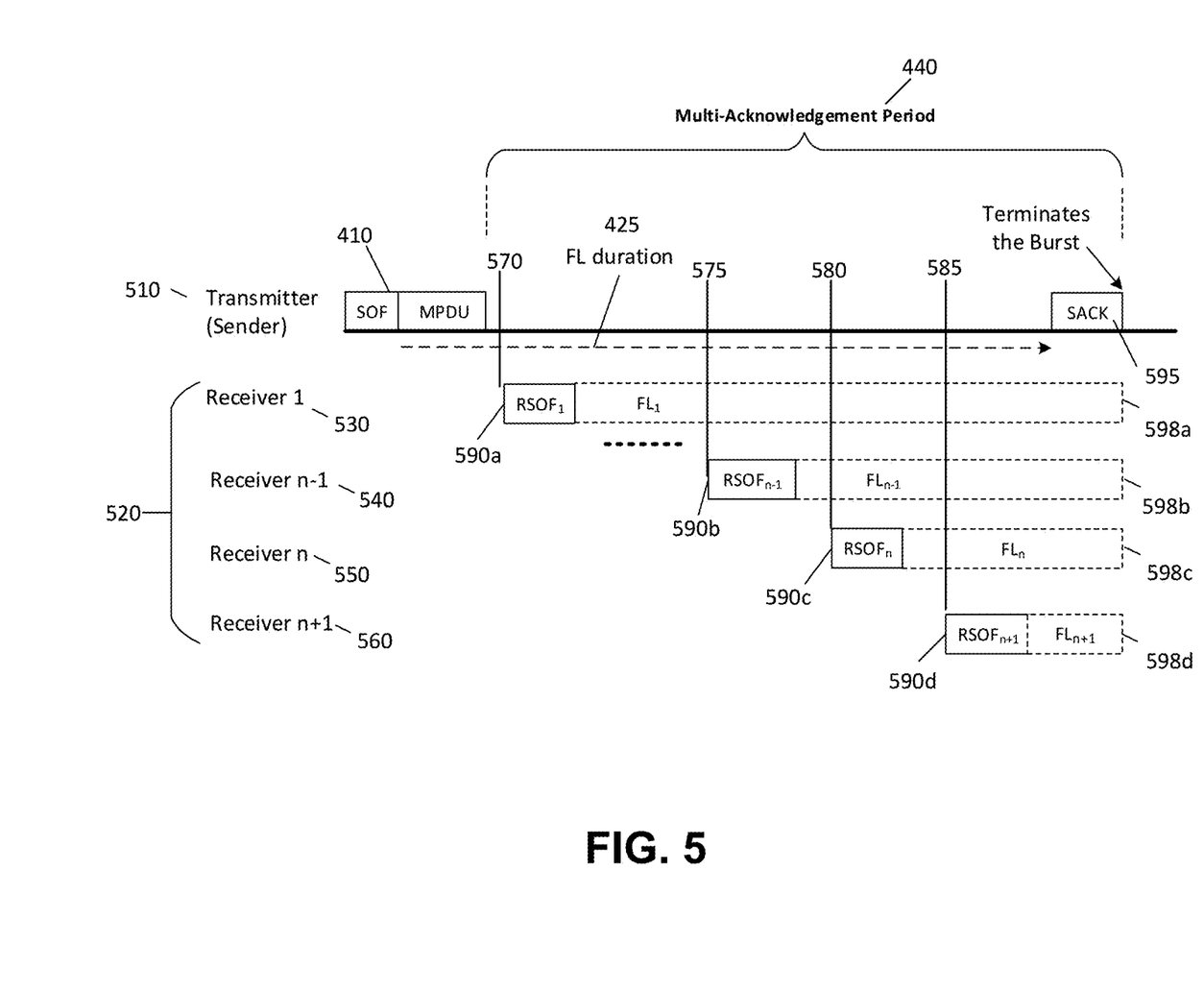
FIG. 5 illustrates an example of a powerline communication multimedia network protocol using SOF and RSOF according to an embodiment.

Reference is now also made to FIG. 5. The multicast transmission is addressed to all of the members of a group of receiving devices 520 that share a common function (such as in the example of audio speakers). It is followed by a multi-acknowledgment period 440 during which each receiving device in the multicast group acknowledges the status of the last multicast transmission at its assigned acknowledgement time (570, 575, 580 and 585). The acknowledgement delimiter is a reverse start of frame (RSOF) delimiter 590. The RSOF delimiter does not transmit any payload, but does contain frame length 598a-d that extends to the end of the FL allocated by the SOF 425. Because the FL sent within the RSOF indicates when the multi-acknowledgment period is over, any network device that may be hidden to the original transmitter can use the RSOFs to determine when to contend for access. The RSOF's acknowledgment time for each device in the multicast group is part of the initialization protocol previously mentioned. The specific receiver's acknowledgement time can be assigned to each receiver from the end of the MPDU payload, or a receiver may be assigned a unique sequence number within the multicast group and calculate its acknowledgment time based on an offset time (transmitted in the SOF) multiplied by the receiver's sequence number. For example, the SOF may transmit a SOF FL number that was generated by adding the RSOF duration plus a time space between the RSOFs to account for timing variations (the "RSOF interfame spacing" (RSIFS)), times the number of devices in the multicast group. The receiver can multiply its sequence number by the FL divided by the number if devices in the multicast group to calculate the acknowledgement time for each receiver. Each receiver than sends a RSOF in its time window as an acknowledgement. If any RSOF is received by the original transmitter during the multi-acknowledgment period, the original transmitter concludes that there were no collisions with other devices on the network. If any receiver does not acknowledge or acknowledges that the data was not received, the original transmitter can retransmit the packet. If a receiver does not acknowledge the packet, the transmitter can retransmit the packet or extend the acknowledgement window by transmitting another SOF before the FL expires and request the receiver to acknowledge again. Any device can terminate the multi-acknowledgment period by sending a selective acknowledgment (SACK) delimiter, but the preferred method is for the last device in the multicast group sequence to terminate the multi-acknowledgment period. At the end of the original FL, all devices in the network look for the next delimiter and can contend for access.

The disclosed protocol method is an independent method but is also compatible with and can be used to modify existing native protocols such as the IEEE 802.11 series standard, the IEEE 1901-2010 standard and HomePlug AV-based specifications. The ability to hold off a transmission for an acknowledgement period is similar to HomePlug AV's bidirectional burst method except that the Multi-ACKed Multicast protocol modifies the SOF and RSOF delimiters to support multi-acknowledgements from multiple receivers which is specifically not permitted or anticipated in HomePlug AV. By modifying an existing mechanism, the Multi-ACKed Multicast protocol can be initialized using compatible delimiters and operates within the acknowledgement period which is isolated from and can contain a protocol that is different from the native protocol, without affecting the native protocol. In this way the protocol can be used to modify an existing (native) protocol to support the Multi-ACKed Multicast protocol.

In another embodiment, the RSOF transmissions 590 from the receiver to the original transmitter include digital information about the quality of the received signal. The transmitter analyzes the RSOF digital information and decides which carrier frequencies and other transmitter parameters will result in the most efficient and successful communications with all of the group's devices. The result is communicated to the receiver group using a common tone map.

Figure 6:
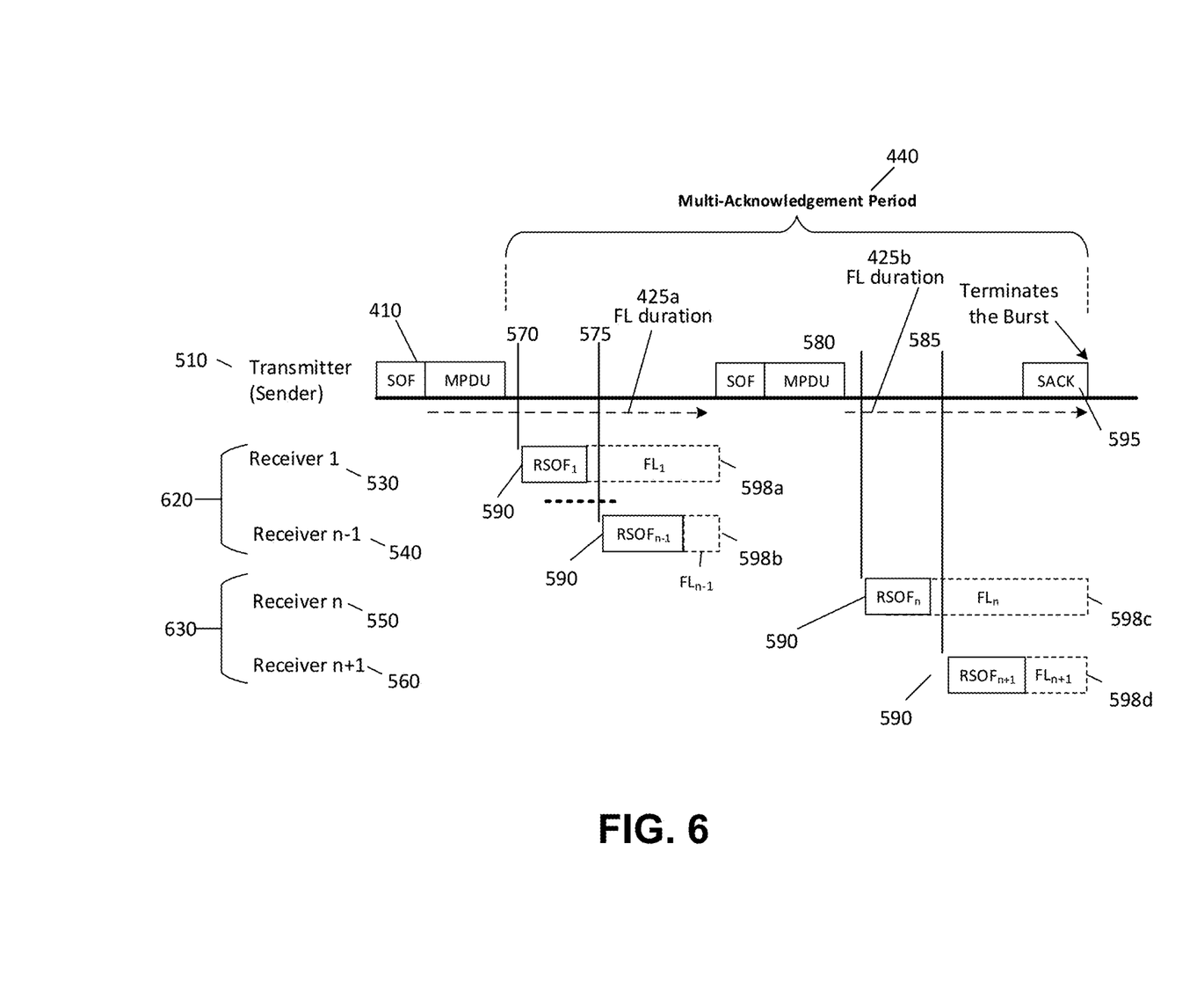
FIG. 6 illustrates an example of a powerline communication multimedia network protocol using multiple SOFs per burst and RSOF according to an embodiment.

In another embodiment, as illustrated in FIG. 6, before the FL period 425 expires or is terminated, the transmitter may send a subsequent SOF delimiter 610 to continue to transmit without contending for medium access, or send a selective acknowledgement (SACK) 595 delimiter to relinquish medium ownership and end the Multi-ACKed Multicast protocol's multi-acknowledgment period. Different subgroups 620, 630 of devices within the group may have different QoS requirements. For example, tweeter speakers may be a subgroup of devices that share the same MPDU payload. A second subgroup may be the bass speakers. In this embodiment, a second or subsequent SOF delimiter 610 may use a different Tone Map or other digital information than the first or subsequent SOFs in order to optimize the communications efficiency and reduce latency. The receivers can be pre-assigned (grouped) to a specific SOF by a local link ID (LID) contained in the SOF.

In yet another embodiment, the RSOF 590 transmission from the receiver to the original transmitter includes digital information about the quality of the received signal. The transmitter analyzes the RSOF digital information and partitions the group into subgroups by channel performance (rather than application function) so that the tone map parameters for each SOF subgroup (620, 630) can be optimized for which channel frequencies and transmission parameters (e.g., modulation) will result in the most efficient, lowest packet latency, communications.

Although not a limitation of this disclosure, the maximum time the transmitter can hold off contention with the Multi-ACKed Multicast protocol is usually limited to allow devices not participating in the group to contend for access to the network. The total original transmitter's concatenated FL is typically between 5 and 10 ms.

When the Multi-ACKed Multicast protocol is used within a native protocol, it can be turned on or off depending on its effectiveness, without affecting interoperability or compatibility with the native protocol. For example, if the transmitter determines that the channel conditions are such that the Multiple-ACKed Multicast protocol is performing less than required by the receiving devices, the Multi-ACKed Multicast protocol can be suspended in favor of a native protocol, such as packet distribution using unicast transmissions to each device, or other methods. The transmitter or upper communications layers decide which protocol to use for each transmission.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A multicast communications method for a carrier sense multiple access (CSMA) network, comprising:
   transmitting, by a transmitter, a multicast transmission to a plurality of receivers, the said multicast transmission comprising a first start of frame (SOF) delimiter and a medium access (MAC) data payload;
   wherein the first SOF contains a first Frame Length (FL) field that establishes a multi-acknowledgment period;
   transmitting, by each of the receivers, an acknowledgement at an assigned acknowledgement time during the multi-acknowledgment period to the transmitter of the multicast transmission, wherein the assigned acknowledgment time is calculated by each of the receivers based on an offset time multiplied by a device group sequence number; and
   wherein the acknowledgment of a respective receiver contains a second FL field that indicates a time until a duration of the multi-acknowledgment period expires; and
   wherein the multicast transmission is terminated by a use of one of: a selective ACK (SACK) by one of the receivers or an expiration of the multi-acknowledgment period.

2. The method in claim 1, where the acknowledgement is a Reverse SOF (RSOF) delimiter containing the second FL field that indicates information calculated to be equal to a time remaining in the multi-acknowledgment period set by the first FL field.

3. The method of claim 1, wherein the acknowledgement contains digital information about communications quality, further comprising using the digital information about communications quality by the transmitter to determine one or more parameters to use in a common Tone Map for subsequent multicast transmissions.

4. The method of claim 1, further comprising:
   transmitting a second SOF delimiter having a tone map that is optimized for a subgroup of receivers whose acknowledgment window falls at one of: after the second SOF but before a subsequent SOF, or SACK or expiration of the multi-acknowledgment period specified in the first FL field;
   wherein each tone map is used to optimize a communications efficiency for that subgroup of receivers.

5. The method of claim 4, wherein a link identification (LID) is used by different SOFs to create separate subgroups of receivers.

6. The method of claim 4, wherein the acknowledgment contains digital information about communications quality, and further comprising using the digital information about communications quality by the transmitter to group the receivers into subgroups that share a subgroup-specific Tone Map that is optimized for that subgroup; wherein the Tone Map is used by the SOF and the devices within the subgroup are assigned to acknowledgement times at one of: after the SOF and before a subsequent SOF, or SACK or expiration of the multi-acknowledgment period specified by the first FL.

7. The method of claim 1, wherein communicating using the Multi-ACKed Multicast protocol is compatible and compliant with a native communications protocol of the CSMA network.

8. The method of claim 7, wherein the Multi-ACKed Multicast protocol is compatible and compliant because it does not affect interoperability with a non-participating group receivers in the CSMA network that are using the native communications protocol.

9. The method of claim 7, wherein the Multi-ACKed Multicast protocol is compatible and compliant because it may be terminated without affecting interoperability of any device in the CSMA network that is using the native communications protocol.

10. The method of claim 4, further comprising: discontinuing the multicast transmission in favor of a native distribution protocol method when the transmitter determines that the performance of the network is not as effective as a native protocol transmission.

11. The method of claim 10, wherein the native distribution protocol method is unicast.

* * * * *